No. 666,885. Patented Jan. 29, 1901.
A. S. NEWTON.
WASTE TRAP.
(Application filed Oct. 26, 1900.)
(No Model.)

WITNESSES: Chas. H. Luther Jr.
A. E. Hagerty

INVENTOR: Albert S. Newton
by Joseph H. Miller & Co.
ATTORNEYS

UNITED STATES PATENT OFFICE.

ALBERT S. NEWTON, OF PROVIDENCE, RHODE ISLAND.

WASTE-TRAP.

SPECIFICATION forming part of Letters Patent No. 666,885, dated January 29, 1901.

Application filed October 26, 1900. Serial No. 34,431. (No model.)

*To all whom it may concern:*

Be it known that I, ALBERT S. NEWTON, a citizen of the United States, and a resident of Providence, in the county of Providence and State of Rhode Island, have invented a new and useful Improvement in Waste-Traps, of which the following is a specification.

Waste water usually contains alkali and fatty matter. These combine and form a soapy substance liable to fill up the pipes, lodge in elbows of the pipes, and prevent the discharge of the waste water.

This invention refers to an improvement in a trap designed to arrest the grease and soapy matter and prevent its entrance into the drain-pipe.

The object of the invention is to protect the outflow-pipe of a trap; and to this end the invention consists in the peculiar and novel construction of the trap, whereby combined greasy or soapy matter is collected in the trap, as will be more fully set forth hereinafter.

Figure 1:
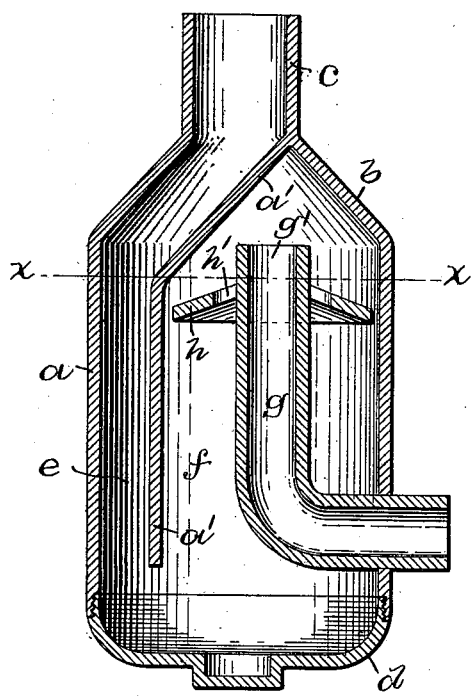
Figure 2:
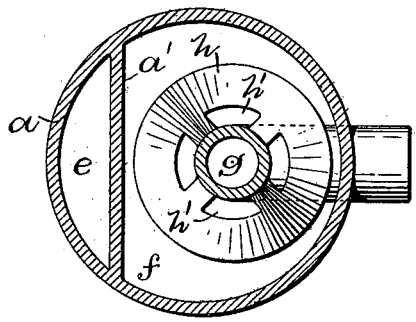

Figure 1 is a vertical sectional view of my improved waste-trap. Fig. 2 is a transverse sectional view of the same on the line X X of Fig. 1.

In the drawings, $a$ indicates the cylindrical main body of the trap; $b$, the conical upper part of the body; $c$, the neck, and $d$ the detachable bottom of the trap.

The interior of the trap is divided by the partition $a'$ into the inlet-duct $e$ and the chamber $f$. The inlet-duct is of considerably less cross-sectional area than the chamber $f$ and connects with the lower part of the chamber, so that the inflowing water flows with the velocity due to its head under the edge of the partition $a'$ into the larger chamber $f$, producing a churning motion in the water of the lower part of the chamber $f$. The duct $g$, which in the preferred form is located in about the center of the chamber $f$, has its inlet $g'$ in the upper end of the chamber $f$ and extends downward to near the lower end of the chamber, where it passes through the wall of the trap and is connected with the waste-pipe. The dished guard-plate $h$, having the openings $h'\ h'$ in the higher part of the guard near the wall of the duct $g$, extends from the duct near the inlet.

The bottom $d$ may be secured by means of a screw-thread engagement or by any other usual means.

By the use of my improved waste-trap the fatty matter is retained by the guard-plate $h$. The churning of the water facilitates to coagulate or combine the matter in the waste water, so that it floats upward and is retained by the guard which holds the more solid or viscous matter and allows the water to flow through the openings $h'\ h'$.

Having thus described my invention, I claim as new and desire to secure by Letters Patent—

1. A waste-trap having a contracted inlet-passage and a larger chamber, connected with each other near the bottom, a detachable bottom, a vertical outflow-duct extending from the upper part of the larger chamber to near the bottom, and a guard extending from near the inlet of the outlet-duct, as described.

2. A waste-trap having a cylindrical body, a partition dividing the interior unequally into an inlet-duct and a larger chamber, a detachable bottom, a duct extending from the upper part of the larger chamber through the wall of the trap near the bottom, and a perforated guard-plate in the upper end of the larger chamber, whereby floating fat is retained, as described.

3. The combination with the cylindrical body $a$ of the trap, the conical end $b$, the neck $c$, the partition $a'$ dividing the interior into the duct $e$, the large chamber $f$, and the bottom $d$, of the duct $g$ extending downward near the center from the upper part of the chamber $f$ to the outside near the bottom, and the dished guard-plate provided with the openings $h'\ h'$, said guard-plate surrounding the inlet to the duct $g$, as described.

In testimony whereof I have signed my name to this specification in the presence of two subscribing witnesses.

ALBERT S. NEWTON.

Witnesses:
J. A. MILLER, Jr.,
ADA E. HAGERTY.